United States Patent Office 3,509,032
Patented Apr. 28, 1970

3,509,032
CHLOROPYRIMIDINES
Gunther Beck and Hans Holtschmidt, Leverkusen, Germany, assignors to Farbenfabriken Bayer Aktiengesellschaft, Leverkusen, Germany, a corporation of Germany
No Drawing. Filed Oct. 31, 1967, Ser. No. 679,527
Claims priority, application Germany, Feb. 9, 1967, F 51,475; Mar. 15, 1967, F 51,820; June 8, 1967, F 52,634, F 52,635
The portion of the term of the patent subsequent to Apr. 14, 1987, has been disclaimed
Int. Cl. B01j *1/10;* C07d *51/36*
U.S. Cl. 204—158                                    15 Claims

ABSTRACT OF THE DISCLOSURE

Chloropyrimidines are formed by treating a compound of the formula

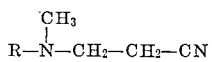

at a temperature between 0° C. and 250° C. with an excess of gaseous chlorine.

---

The object of the invention comprises a process for the production of chlorinated pyrimidines.

It has been found that chlorinated pyrimidines are obtained by reacting a 3-methylaminopropionitrile of the formula

         (I)

in which R denotes hydrogen or a radical which can be split off under the conditions of the reaction, optionally in admixture with an inert diluent, at temperatures of 0 to 250° C., with an excess of clorine, preferably under ultraviolet irradiation.

Suitable radicals R which are splittable under the conditions of the reaction are, in particular, lower alkyl groups, such as primarily —CH$_3$, and substituted methyl groups, such as —CH$_2$Cl, —CH$_2$—OH etc., as well as acyl radicals, such as CH$_3$CO.

Some of the starting compounds of the Formula I are known.

Methylaminopropionitriles of the Formula I which are suitable for the process are, for example, 3-dimethylaminopropionitrile, 3 - methylaminopropionitrile, 3 - N-acetyl-N-methylaminopropionitrile. The use of 3-dimethylaminopropionitrile is especially preferred; it can be obtained by the addition of dimethylamine on acrylonitrile. The amines can be used in the form of their free bases as well as in the form of their salts with inorganic or organic acids, e.g. in the form of the hydrochlorides etc.

In general, the process is carried out by mixing a methylaminopropionitrile of the above Formula I, preferably the 3-dimethylaminopropionitrile, with a diluent and then passing gaseous chlorine into or onto the mixture. The reaction with chlorine is effected in the presence or absence of a catalyst. Especially satisfactory results are achieved if the chlorination is carried out under irradiation with ultraviolet light, particularly when the first exothermal reaction has subsided.

The chlorine is expediently used for the reaction in excess, but at the start of the chlorination reaction an excess of chlorine is not advantageous, since otherwise the exothermal reaction becomes too violent.

Diluents which are inert under the conditions of the reaction are all those solvents which are stable to chlorine, e.g. chlorinated aliphatic and aromatic hydrocarbons, such as chloroform, tetracarbon chloride, hexachlorocyclopentadiene, octachlorocyclopentene, 1,2,4 - trichlorobenzene, 1,1,2,3,3-pentachloropropane and chlorinated pyrimidines. Chloroform is especially suitable as diluent.

The process is preferably carried out in such a manner that first a methylaminopropionitrile of the Formula I, particularly the 3-dimethylaminopropionitrile, is mixed with a diluent, preferably boiling below 100° C., especially chloroform, and passing gaseous chlorine into or onto the mixture in an open or closed vessel. Thus, at first a strongly exothermal reaction takes place which in many cases necessitates an external cooling. When the exothermal reaction has subsided, the solution is expediently subjected to an ultraviolet irradiation, while raising the temperature, for example, to 50–100° C., whereby the chlorination proceeds. In general, it is especially advantageous to heat the reaction mixture to the boiling point of the solvent or diluent, when chloroform is used this means to about 60–65° C., and to continue the chlorination until further chlorine is no longer taken up at the boiling temperature of the diluent or solvent. A higher boiling diluent may subsequently be added (boiling point, for example, between 100 and 300° C.) and the first diluent may be removed, e.g. by distilling it off; alternatively, it is also possible to retain at first the original solvent, especially chloroform, which is then distilled off in the further course of the chlorination.

The reaction temperature is then slowly raised to about 150–220° C. by heating and optionally under further ultraviolet irradiation and the chlorination continued until the desired chloropyrimidines are obtained.

The ratio by volume between diluent and the methylaminopropionitrile of the Formula I, especially 3-dimethy-l-aminopropionitrile, is preferably 1–20 parts by volume diluent per one part by volume of the compound (I). It is also possible to work without diluent, but the use of a diluent is generally preferred.

If the chlorination according to the invention is carried out in the presence of a chlorination catalyst, iron (III) chloride, for example, may be used for this purpose.

In general, the process according to the invention leads to mixtures of chloropyrimidines of different degrees of chlorination. The degree of chlorination of the products obtained essentially depends upon the duration of chlorination, the reaction temperature and the catalytic influence on the reaction, e.g. the ultra-violet irradiation. When the first exothermal chlorination reaction has subsided, there are obtained by a brief after-chlorination at temperatures up to about 150° C. mainly di- and tri-chlorinated pyrimidines, such as 4,5-dichloropyrimidine and 4,5,6-trichloropyrimidine. When the chlorination is carried out for a prolonged time, e.g. for 5 to 15 hours at 180 to 220° C., mixtures of tri- and tetra-chloropyrimidines, such as 4,5,6-trichloropyrimidine and 2,4,5,6-tetra-chloropyrimidine, are obtained, e.g. in a proportion by weight of about 80:20 to about 20:80. When the chlorination is further continued, this proportion shifts in favour of the tetrachloropyrimidine. The resultant mixture can be separated into the individual chloropyrimidines by fractional distillation.

According to the invention, there are preferably obtained 4,5-dichloropyrimidine (B.P. 65–67° C./12 mm. Hg) and, more especially, 4,5,6-trichloropyrimidine (B.P. 87° C./12 mm. Hg) and 2,4,5,6-tetrachloropyrimidine (B.P. 110° C./12 mm. Hg). On account of their very different boiling points, these compounds can easily be separated by distillation, for example, with the aid of a column.

If, as the end product, mainly tetrachloropyrimidine is to be obtained, then there can be separated from the first obtained mixture of chloropyrimidines the lower chlorinated components, including the trichloropyrimidine, and these components can be again used for the chlorination reaction.

The object of the invention primarily comprises processes for the production of 4,5,6-trichloropyrimidine and 2,4,5,6-tetrachloropyrimidine.

It has been found that 4,5,6-trichloropyrimidine and 2,4,5,6-tetrachloropyrimidine are obtained in a simple manner and with good yields when 4,5-dichloropyrimidine or its salts are chlorinated under the action of ultra-violet light at 150 to 250° C., optionally in the presence of a diluent.

The chlorination is carried out, for example, by passing into a melt, a solution or a mixture of 4,5-dichloropyrimidine a current of chlorine at temperatures of about 150 to 220° C., in an open or closed vessel, simultaneously irradiating with ultra-violet light and carrying out the chlorination until the chlorinaton has reached the desired degree. Depending upon the desired product, the reaction requires between about 5 and 50 hours.

In general, mixtures of 4,5,6-trichloropyrimidine (B.P. 86° C./12 mm. Hg) and 2,4,5,6-tetrachloropyrimidine (B.P. 110° C./12 mm. Hg) are obtained, from which the one or the other halopyrimidine compound can be separated by distillation.

The 4,5-dichloropyrimidine used as starting compound can be obtained in a very simple manner by chlorinating 3-dimethylaminopropionitrile at an elevated temperature and, if desired, under the action of ultra-violet irradiation.

For the preparation of tetrachloropyrimidine, 4,5,6-trichloropyrimidine can also be used in an isolated form and chlorinated under the action of ultra-volet light at about 150 to 250° C.

According to the present process, the 4,5-dichloropyrimidine can also be used in the form of a salt, for example, in the form of the hydrochloride.

4,5,6-trichloropyrimidine can be obtained according to the instructions given in the literature (J. Chem. Soc. 1955, 3478) by reacting 4,6-dihydroxypyrimidine with iodine monochloride to give 5-chloro-4,6-dihydroxypyrimidine which is then further reacted with phosphorus oxychloride to give 4,5,6-trichloropyrimdine.

2,4,5,6-tetrachloropyrimidine is produced on a technical scale by the reaction of 5-chlorobarbituric acid with phosphorus oxychloride in the presence of dimethylaniline or diethylaniline (Swiss patent specification No. 373,045).

In comparison with these previously known processes, the process according to the invention has the advantage that it can be carried out more economically since the starting compound 4,5-dichloropyrimidine is extraordinarily readily obtainable and the whole process less expensive with regard to apparatus.

The chloropyrimidines produced according to the invention possess fungicidal and sporicidal properties (cf. U.S. patent specification No. 3,227,612). Tetrachloropyrimidine is suitable as reactive component for the production of reactive dyestuffs (cf. e.g. Belgian patent specification No. 578,933).

EXAMPLE 1

588 g. (6.0 mol) 3-dimethylaminopropionitrile and 2 litres chloroform are placed into a three-neck flask of 5 litre-capacity, provided with thermometer, gas inlet tube, stirrer and reflux condenser. A dry chlorine current is passed through the gas inlet tube and the reaction flask is externally cooled with ice. When the exothermal reaction has subsided, the cooling is removed and the reaction mixture irradiated with ultra-violet light. Thus, an exothermal reaction again takes place so that cooling becomes again necessary. When this reaction has subsided, there are introduced, under further ultra-violet irradiation, 2 litres octachlorocyclopentene, in the molten state, into the reaction flask. The reaction mixture is then slowly heated, and the chloroform, after stopping the water cooling of the reflux condenser, is slowly distilled off through this condenser. The temperature is slowly and evenly raised until, after heating for about twenty hours, a temperature of 180° C. has been reached. The mixture is then kept at 180 to 200° C. for a further 8 hours under ultra-violet irradiation while continuously further introducing chlorine.

When the reaction is completed, the chloropyrimidines are separated from the reaction mixture by fractional distillation and through a 1 metre-high column.

After first runnings of 78 g. substantially consisting of lower chlorinated pyrimidines, there are obtained at B.P. 87° C./12 mm. Hg, 440 g. 4,5,6-trichloropyrimidine (M.P. 51 to 52° C. from petroleum ether), and at B.P. 110° C./12 mm. Hg, 414 g. 2,4,5,6-tetrachloropyrimidine (M.P. 67 to 68° C. from methanol)

EXAMPLE 2

The process is carried out as described in Example 1 with the difference that the reaction mixture is finally kept for a further 24 hours at 180 to 200° C. under ultra-violet irradiation, while continuously further introducing chlorine. The proportion of 2,4,5,6-tetrachloropyrimidine thus increases to 863 g., whilst the proportion of 4,5,6-trichloropyrimidine decreases to 125 g. and that of lower chlorinated pyrimidines to 23 g.

EXAMPLE 3

294 g. (3.0 mol) 3-dimethylaminopropionitrile and 2 litres chloroform are placed into a three-neck flask of 3 litres-capacity, provided with thermometer, gas inlet tube, stirrer and reflux condenser. A dry chlorine current (about 1–2 litres per minute) is first passed over the vigorously stirred reaction mixture through the gas inlet tube, starting at about 20° C., while externally cooling with ice. The supply of chlorine and the cooling are adjusted to one another in such a way that the reaction temperature is maintained between about 15 and 25° C. When the reaction temperature falls below 15° C., while the external cooling is continued and in spite of increasing the chlorine supply up to about 10 litres per minute, the chlorine current is passed into the reaction mixture in order to further maintain the reaction temperature between about 15 and 25° C. From the start of the reaction, there separates in an increasing degree a precipitate which transforms the reaction mixture into a thickly liquid suspension. When the chlorination, which still proceeds exothermally, is continued between about 15 to 25° C., the suspension progressively becomes again more thinly liquid until, after about 4 to 6 hours after the start of the reaction, a very thinly liquid suspension or a largely clear solution results.

Under intensive ultra-violet irradiation the reaction mixture is then treated with an excess of chlorine, while it is simultaneously heated to the reflux temperature of the chloroform (about 60° C.) until chlorine is no longer taken up (about 6–12 hours). In this way, a thickly liquid suspension is formed. After stopping the water cooling of the reflux condenser, the chloroform is first distilled off and the temperature subsequently increased by about 5 to 10° C. per hour, while further passing in an excess of chlorine. Chlorination is continued at about 120° C. (for about 2–3 hours) until the thick, pale yellow slurry of the substance has become a wine-red, clear liquid. Whether it is desired to obtain 4,5-dichloropyrimidine, 4,5,6-trichloropyrimidine or 2,4,5,6-tetrachloropyrimidine as the main product, the following cases have to be distinguished when further carrying out the reaction:

(a) To obtain 4,5-dichloropyrimidine as the main product, the reaction is interrupted after the formation of the wine-red liquid formed at about 120° C. After mixing with about 1 litre petroleum ether, the hydrochloride of 4,5-dichloropyrimidine is selectively precipitated with gaseous HCl.

(b) To obtain 4,5,6-trichloropyrimidine as the main product, the wine-red solution formed at about 120° C. is further treated with an excess of chlorine at about 200° C. for 6 to 8 hours. The desired 4,5,6-trichloropyrimidine is separated at B.P. 86–88° C. by fractional distillation through a 1 metre-high column at 12 mm. Hg. Yield about 400 g. (about 73% of theory).

(c) To obtain 2,4,5,6 - tetrachloropyrimidine as the main product, the wine-red liquid formed at about 120° C. is treated with an excess of chlorine under intensive ultra-violet irradiation at about 200 to 220° C. for 36 to 40 hours. The fractional distillation through a 1 metre-high column yields at B.P. 108–112° C./12 mm. Hg, 520 g. (about 80% of theory) 2,4,5,6-tetrachloropyrimidine.

EXAMPLE 4

185.5 g. (1.0 mol) 4,5-dichloropyrimidine hydrochloride are treated with an excess of chlorine, starting at the melting temperature (about 110° C.) and increasing the temperature by 10 to 20° C. per hour up to 180 to 200° C., and the chlorination is continued at 180 to 200° C. for a further 6–8 hours. 154 g. (84% of theory) 4,5,6-trichloropyrimidine are obtained at B.P. 86 to 88° C./12 mm. Hg by fractional distillation through a 1 metre-high column. After recrystallisation from petroleum ether the melting point of the product is 51 to 52° C.

EXAMPLE 5

183.5 g. (1.0 mol) 4,5,6-trichloropyrimidine are treated with an excess of chlorine for 30 to 36 hours at 190 to 220° C. under intensive ultra-violet irradiation.

There are obtained by fractional distillation through a 1 metre-high column, at B.P. 108–112° C./12 mm. Hg, 190 g. (87% of theory) 2,4,5,6-tetrachloropyrimidine which, after recrystallisation from methanol, melts at 67–68° C.

The 2,4,5,6-tetrachloropyrimidine is also obtained with about the same yield by subjecting the crude chlorination product of Example 4 directly, without the intermediate isolation of 4,5,6-trichloropyrimidine, to the reaction conditions of this example.

What is claimed is:

1. Process for the production of chloropyrimidines, which comprises treating a compound of the formula

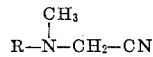

in which R denotes hydrogen, lower alkyl, —CH$_2$Cl, —CH$_2$OH, or CH$_3$CO—, which can be split off under the reaction conditions, at a temperature of between 0° C. and 250° C. with an excess of gaseous chlorine.

2. Process according to claim 1, which comprises performing the reaction in the presence of an inert diluent.

3. Process according to claim 1 which comprises treating a compound of the formula

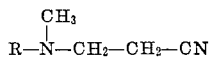

wherein R stands for methyl, at a temperature of between 0° C. and 250° C. with an excess of gaseous chlorine under ultra-violet irradiation in chloroform as inert diluent.

4. Process for the production of 2,4,5,6-tetrachloropyrimidine, which comprises treating a mixture of 3-dimethylaminopropionitrile with a diluent with gaseous chlorine, and after the exothermal reaction has subsided continuing the chlorination under ultra-violet irradiation while raising the temperature to about 50° C. to 100° C. until essentially further chlorine is no longer taken up, then raising the reaction temperature to about 150° C. to about 220° C., and continuing the chlorination under ultra-violet irradiation, and finally isolating 2,4,5,6-tetrachloropyrimidine from the resultant reaction mixture.

5. Process according to claim 4 which comprises using as diluent a diluent boiling below 100° C.

6. Process according to claim 4 which comprises using as diluent chloroform.

7. Process for the production of 4,5,6-trichloropyrimidine, which comprises treating a mixture of 3-dimethylaminopropionitrile with a diluent with gaseous chlorine and after the exothermal reaction has subsided continuing the chlorination under ultra-violet irradiation while raising the temperature to about 50° C. to about 100° C. until essentially further chlorine is no longer taken up, then raising the temperature to about 150° C. to about 220° C., and continuing the chlorination under ultra-violet irradiation, and finally isolating the 4,5,6-trichloropyrimidine from the reaction mixture.

8. Process according to claim 7 which comprises using as diluent a diluent boiling below 100° C.

9. Process according to claim 7 which comprises using as diluent chloroform.

10. Process for the production of 4,5,6-trichloropyrimidine and 2,4,5,6-tetrachloropyrimidine, which comprises contacting 4,5-dichloropyrimidine or its salts with gaseous chlorine at a temperature of about 150° C. to about 250° C. under ultra-violet light.

11. Process according to claim 10, which comprises carrying out the reaction in the presence of a diluent.

12. Process for the production of 2,4,5,6-tetrachloropyrimidine which comprises contacting 4,5,6-trichloropyrimidine with gaseous chlorine under the action of ultra-violet light at a temperature of about 150° C. to about 250° C.

13. Process according to claim 1 wherein R is methyl or CH$_3$CO.

14. Process of claim 13, wherein said treating is without addition of external heat until subsidence of exothermal reaction, and subsequently is at an elevated temperature up to 150° C. for a time sufficient to form a mixture of di- and trichloronated pyrimidines.

15. Process of claim 14, wherein said treating is further conducted at temperatures from about 180° to about 220° C. for a time sufficient to form a mixture of tri- and tetrachloropyrimidines.

References Cited

UNITED STATES PATENTS 3,365,452   1/1968   Weidinger et al. _____ 260—248

ALEX MAZEL, Primary Examiner

R. V. RUSH, Assistant Examiner

U.S. Cl. X.R.

260—251

UNITED STATES PATENT OFFICE
CERTIFICATE OF CORRECTION

Patent No. 3,509,032      Dated April 28, 1970

Inventor(s) GUNTHER BECK, ET AL.

It is certified that error appears in the above-identified patent and that said Letters Patent are hereby corrected as shown below:

| Column | Line | Error |
|--------|------|-------|
| 3 | 42 | "trichloropyrimdine" should read --- trichloropyrimidine ---. |
| 5 | Claim 1 line 45 | " $R - N(CH_3) - CH_2 - CN$ " should read --- $R - N(CH_3) - CH_2 - CH_2 - CN$ --- |

SIGNED AND SEALED

SEP 29 1970

(SEAL)
Attest:

Edward M. Fletcher, Jr.
Attesting Officer

WILLIAM E. SCHUYLER, JR.
Commissioner of Patents